(12) United States Patent
McConnell et al.

(10) Patent No.: US 9,625,598 B2
(45) Date of Patent: Apr. 18, 2017

(54) COHERENT SOUND SOURCE FOR MARINE SEISMIC SURVEYS

(71) Applicant: Applied Physical Sciences Corp., Groton, CT (US)

(72) Inventors: James A. McConnell, Vienna, VA (US); Evan F. Berkman, Newton, MA (US); Bruce S. Murray, Winchester, MA (US); Bruce M. Abraham, Waterford, CT (US)

(73) Assignee: Applied Physical Sciences Corp., Groton, CT (US)

( * ) Notice: Subject to any disclaimer, the term of this patent is extended or adjusted under 35 U.S.C. 154(b) by 68 days.

(21) Appl. No.: 14/421,006

(22) PCT Filed: Aug. 8, 2013

(86) PCT No.: PCT/US2013/054082
§ 371 (c)(1),
(2) Date: Feb. 11, 2015

(87) PCT Pub. No.: WO2014/028293
PCT Pub. Date: Feb. 20, 2014

(65) Prior Publication Data
US 2015/0234072 A1 Aug. 20, 2015

Related U.S. Application Data

(60) Provisional application No. 61/682,461, filed on Aug. 13, 2012.

(51) Int. Cl.
*G01V 1/38* (2006.01)
*G01V 1/02* (2006.01)

(52) U.S. Cl.
CPC ............ *G01V 1/3861* (2013.01); *G01V 1/159* (2013.01)

(58) Field of Classification Search
CPC .......................... G01V 1/159; G01V 1/3861
See application file for complete search history.

(56) References Cited

U.S. PATENT DOCUMENTS 3,684,050 A   8/1972  Johnston
5,062,089 A  10/1991  Willard et al.
(Continued)

OTHER PUBLICATIONS

Sherman et al., Transducers and Arrays for Underwater Sound, The Underwater Acoustics Series, Springer, 2007, 10 pages.

*Primary Examiner* — Daniel Pihulic

(57) ABSTRACT

A coherent sound source is provided for marine seismic surveys. An underwater sound projector for producing time-harmonic waveforms comprises two pistons positioned on either side of an electro-magnetic force generator substantially having mechanical and magnetic symmetry about its geometric center thereby creating a virtual node to substantially cancel reaction loads that occur when the pistons are actuated. The underwater sound projector optionally also includes control systems to improve the fidelity of the force generator, provide pressure compensation to the pistons, finely adjust the static position of the pistons, and change the depth and roll when it is configured as tow body. A plurality of underwater sound projectors can be configured in an array. A load-bearing umbilical can connect the underwater sound projectors to a ship, transmit electrical power to each array element and serve as a duplex data transmission medium to route commands from the ship to the projector and report machinery status to the ship.

17 Claims, 7 Drawing Sheets

(56) References Cited

U.S. PATENT DOCUMENTS

| | | | | |
|---|---|---|---|---|
| 5,949,544 A | * | 9/1999 | Manning | G01J 3/02 |
| | | | | 356/452 |
| 6,483,778 B1 | | 11/2002 | Pozzo et al. | |
| 8,570,835 B2 | * | 10/2013 | Chelminski | G01V 1/135 |
| | | | | 367/172 |
| 2002/0141287 A1 | | 10/2002 | Lazaratos | |
| 2012/0113756 A1 | | 5/2012 | Carcaterra et al. | |
| 2015/0234072 A1 | * | 8/2015 | McConnell | G01V 1/159 |
| | | | | 367/168 |

* cited by examiner

200

300

*FIG. 7*
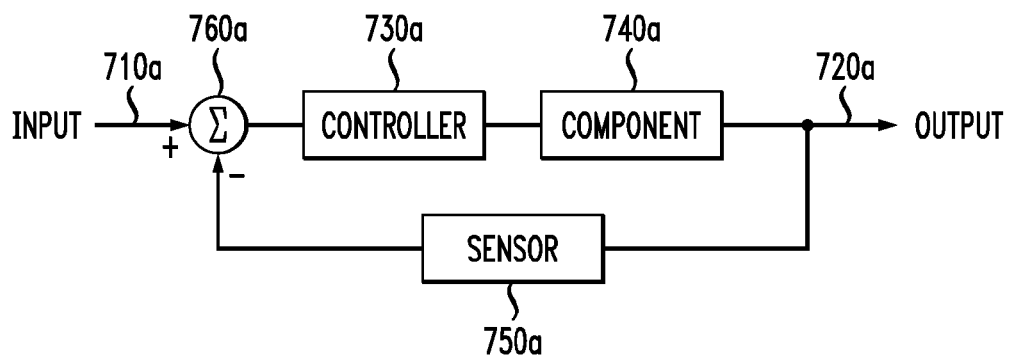
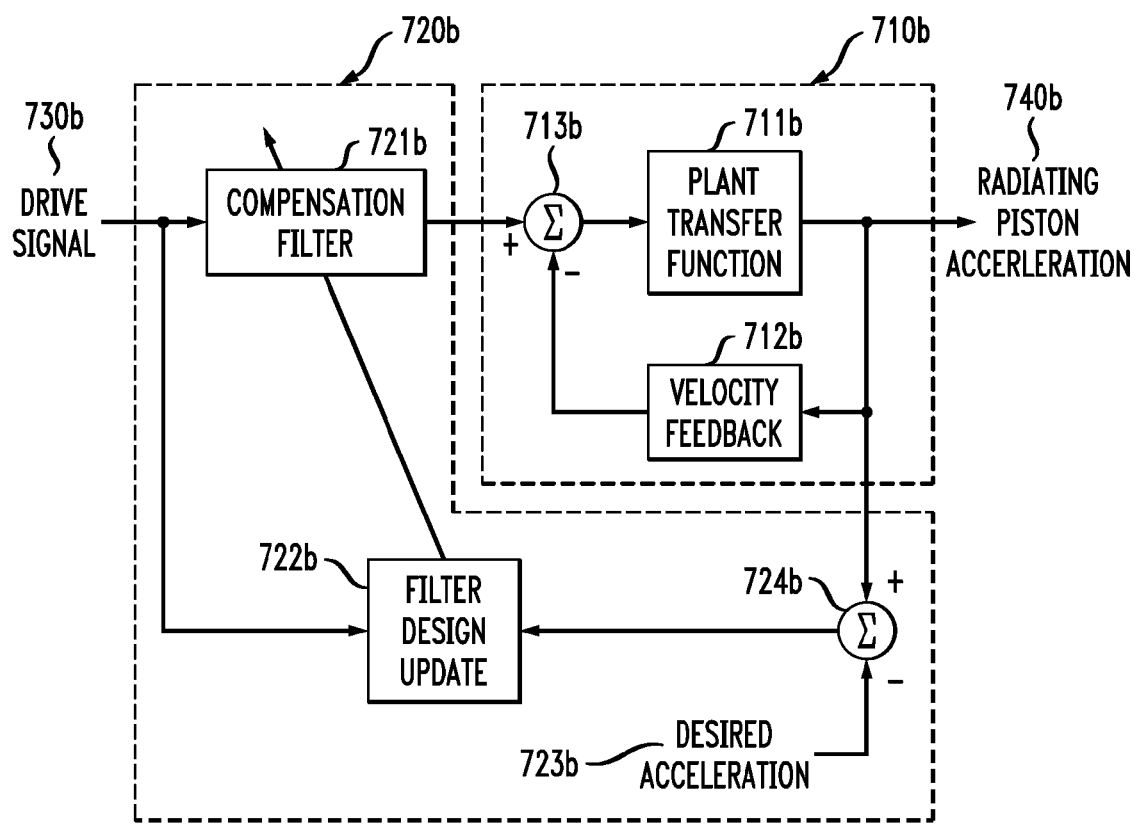

COHERENT SOUND SOURCE FOR MARINE SEISMIC SURVEYS

CROSS-REFERENCE TO RELATED APPLICATIONS

The present application claims priority to U.S. Provisional Patent Application Ser. No. 61/682,461, filed Aug. 13, 2012, entitled, "Coherent Sound Source for Marine Seismic Surveys," incorporated by reference herein.

FIELD OF THE INVENTION

The present invention relates generally to piston-type sound projectors that employ an electro-magnetic driver and have application to marine seismic surveys.

BACKGROUND OF THE INVENTION

Sound waves are the primary tool used to search for oil and gas reserves beneath the Earth's strata. Sound waves are convenient because they can propagate over long distances and penetrate into complex layered media to obtain important information regarding the presence, composition, and physical extent of reserves. This is the case for surveys conducted on both land and water. Although a variety of methods have been used to generate sound waves in water, the primary technique over the past three decades is the use of air guns, which expel short bursts of high-pressure air. The creation and collapse of air bubbles produced by this process causes high-energy sound waves to be directed toward the seafloor with approximately 98% of the energy generated over the frequency range from 5 to 200 Hz. The waves penetrate into the strata and differentially reflect back towards the surface where they are recorded by an array of receivers (i.e., hydrophones).

Generally speaking, marine seismic surveys are performed by towing 12 to 48 air guns 300 to 500 m behind a survey vessel at depths on the order of 1 to 10 m. The air guns are typically configured in a planar array and produce source levels up to 240 dB are 1 µPa-m. These are impulsive sounds that result from the sudden discharge of high-pressure air and have a duty cycle ranging from 5 to 20 seconds. The receiving array that records the direct and reflected sound waves is usually comprised of up to 16 streamers each with hundreds of hydrophones. The streamers are typically 3 to 12 km long and have a lateral spacing anywhere from 50 to 100 m. The source-receiver configuration coupled with tow speeds ranging from 1.5 to 2.5 m/s facilitates survey rates on the order of 10 $km^2$/day.

For more information on marine seismic surveys, please consult "Marine Geophysical Operations: An Overview," *International Association of Geophysical Contractors* (June 2009), or "An Overview of Marine Seismic Operations," *International Association of Oil and Gas Producers*, Report No. 448 (April 2011), each incorporated by reference herein. For more information on air guns used in marine seismic surveys, please see, e.g., W. Dragoset, "An Introduction to Air Guns and Air-Gun Arrays," *The Leading Edge,* 19 (8), 892-897 (2000) or J. Caldwell and W. Dragoset, "A Brief Overview of Seismic Air-gun Arrays," *The Leading Edge,* 19 (8), 898-902 (2000), each incorporated by reference herein.

For many years there have been growing concerns by environmentalists, scientists, and governments that increasing sound levels in the marine environment might be detrimental to a variety of marine life. Marine mammals are the primary concern along with fish and invertebrates which are secondary. A review of these issues as they pertain to marine mammals can be found in "Airgun Arrays and Marine Mammals," *International Association of Geophysical Contractors* (August 2002), incorporated by reference herein. Because of the increasing concerns over potential sound effects to marine biota, there are growing concerns that marine seismic surveys could be significantly restricted by future regulations. With these concerns in mind, the oil and gas industry has considered alternatives to air guns, and in particular using marine vibrators that can provide a coherent (i.e., non-impulsive) source of acoustic energy to enhance the efficacy of the system. There are numerous features that marine vibrator-based seismic survey systems offer that are important as they relate to environmental considerations. For example:

(1) The use of a coherent source can provide excitation over a much longer time interval than an incoherent (i.e., impulsive) source, such as an air gun, which is thought to pose lower risk to marine life because the same nominal energy, over a specific band of interest, can be spread-out over time rather than being concentrated at an instant;

(2) The use of a coherent source has a greater propensity to reduce or eliminate high-frequency components (e.g., sounds greater than 100 Hz) relative to an incoherent source since the frequency domain representation of the signals associated with a coherent source is typically concentrated at deterministic and controllable frequencies thereby confining the sound energy to a specific band which can be tailored to provide minimal risk to certain species of marine life.

A comprehensive review of the environmental impact of marine seismic surveys performed using marine vibrators as opposed to air guns can be obtained from "Environmental Assessment of Marine Vibroseis," prepared by LGL, Ltd and Marine Acoustics, Inc., LGL Report TA4604-1, JIP Contract 22 07-12 (April 2011), incorporated by reference herein.

While there are several environmental advantages associated with the use of coherent sound sources for marine seismic surveys, there are also benefits of using them to improve the performance of the survey system as a whole. For example, the use of coherent sound sources for marine seismic surveys allows the excitation signal associated with the projector array and the signal processing algorithms associated with the receive array to be tailored so that the most accurate image of the layered media under evaluation is created. Some examples of excitation signals include, but are not limited to frequency-modulated (FM) sweeps and pseudo-random noise (PRN).

Resident in the characteristics of these signals is the ability of the projector (or multiple projectors used in an array) to be controlled in a precise manner, which is not an easy or straightforward proposition with incoherent sources like air guns. Data collection systems that rely on FM and PRN signals can employ signal processing techniques such as matched filters to improve the signal-to-noise ratio without the need for increasing the source level. Processing gains can also be achieved through long integration times associated with coherent signals which are generated for extended periods of time. Reference textbooks that provide the details of these processing techniques as well as others include W. S. Burdic, *Underwater Acoustic System Analysis*, Prentice Hall, Inc. (1984); and A. D. Whalen *Detection of Signals in Noise*, Academic Press (1971), each incorporated by reference herein.

Historically speaking, the use of coherent sound sources in connection with marine seismic surveys has not been widespread, but some devices have been reduced to practice. Marine vibrators, comprised of a hydraulically actuated piston and a flextensional transducer, have been developed as described in W. D. Weber and G. R. Johnson, "An Environmentally Sound Geophysical Source—The Transition Zone Marine Vibrator," *Conference Proceedings, Society of Petroleum Engineers*, Paper SPE 46805 (1988) and "PGS Electrical Marine Vibrator," *TechLink—A Publication of PGS Geophysical*, 11 (5) (November 2005), each incorporated by reference herein. The concept of a hydraulically actuated piston designed for in-water use is an adaptation of the principal transduction mechanism employed by land vibrators such as those developed by Industrial Vehicles International (Tulsa, Okla.). The flextensional transducer generally conforms to a Class IV design and utilizes electrical coils in connection with a magnetic circuit as the principal transduction method. This was done in contrast to the traditional use of a longitudinal piezoelectric actuator so that the device could meet performance requirements in the operational band of interest (i.e., nominally 5 to 100 Hz). Interestingly, two separate flextensional transducers are required to cover the entire band.

As discussed further below, aspects of the present invention rely on a piston-type sound projector that employs an electro-magnetic driver which conforms to a moving armature force generator. See, for example, U.S. Pat. Nos. 5,206,839, 5,266,854, and 5,587,615. U.S. Pat. No. 5,206,839 describes a device configured as an underwater sound projector. U.S. Pat. Nos. 5,266,854 and 5,587,615 describe devices configured as vibratory shakers. The devices described in U.S. Pat. Nos. 5,206,839 and 5,266,854 utilize a magnetic circuit comprised of E-shaped and I-shaped laminated structures wherein the E-shaped structure is fitted with separate windings for alternating and direct currents (AC and DC). The DC signal provides a magnetic bias that is used in concert with an appropriately phased AC signal to generate motion in the I-shaped structure which constitutes the moving armature assembly. This arrangement results in force output that is linear with the applied current. It is noted that without the DC magnetic bias, moving armature transducers are inherently nonlinear and tend to be undesirable for use in numerous applications.

The device described in U.S. Pat. No. 5,587,615 foregoes the use of a DC winding in favor of a permanent magnet, resulting in a magnetic circuit design that employs multiple elongate laminated structures (i.e., magnetic cores) that contain AC windings and a single permanent magnet positioned between the cores to provide the magnetic bias. This arrangement is substantially different than that described in U.S. Pat. Nos. 5,206,839 and 5,266,854, but provides force output in the moving armature assembly that is linear with the applied current.

SUMMARY OF THE INVENTION

Generally, a coherent sound source is provided for marine seismic surveys. According to one aspect of the invention, an underwater sound projector is provided for producing time-harmonic waveforms. The underwater sound projector comprises two pistons positioned on either side of an electro-magnetic force generator substantially having mechanical and magnetic symmetry about its geometric center thereby creating a virtual node to substantially cancel reaction loads that occur when the pistons are actuated.

In one exemplary embodiment, the electro-magnetic force generator relies on a variable reluctance principal and utilizes a superposition of AC and DC magnetic flux generated by coils and permanent magnets positioned within a stationary magnetic circuit comprised of a laminated structure to produce dynamic forces on moving armature assemblies that are linear with the AC current applied to the coils. The moving armature assemblies are physically connected to pistons that are sized to generate sound waves without cavitation.

According to a further aspect of the invention, the underwater sound projector optionally also includes a feedback controller to reduce the mechanical quality factor of the fundamental resonance associated with the force generator and pistons. The underwater sound projector can be configured in a near neutrally buoyant hydrodynamic tow body and contain control surfaces that are operated by a feedback control system to adjust the submergence depth and roll angle.

In another exemplary embodiment, the underwater sound projector further comprises an in-line adaptive compensation filter to ensure that a far-field radiated signal from an array of the projectors is substantially equivalent to a superposition of all array elements operating in phase with the same source strength. In another variation, the underwater sound projector optionally includes a pressure compensation system utilizing high pressure air regulated by a feedback control system to balance a static load on the pistons resulting from submergence in water. In yet another variation, the underwater sound projector optionally includes means to finely adjust the static position of each piston-armature assembly using a DC bias applied to the coil that is regulated by a control system that employs a proximity/positional sensor such as a linear variable differential transformer (LVDT).

According to yet another aspect of the invention, a plurality of underwater sound projectors can be configured in an array to produce time-harmonic waveforms at a greater source level than a single sound projector operating alone. The underwater sound projectors comprise two pistons positioned on either side of an electro-magnetic force generator substantially having mechanical and magnetic symmetry about its geometric center thereby creating a virtual node to substantially cancel reaction loads that occur when the pistons are actuated; control systems to improve the fidelity of the force generator, provide pressure compensation to the pistons, finely adjust the static position of each piston-armature assembly, and change the depth and roll when it is configured as tow body; and a load-bearing umbilical that connects the underwater sound projector to a ship, transmits electrical power to each array element and serves as a duplex data transmission medium to route commands from the ship to the projector and report machinery status to the ship. The array of underwater sound projectors are optionally controlled remotely by a computer positioned on the ship and controlled locally by a computer positioned within each array element with the computers operating in a master-slave arrangement.

A more complete understanding of the present invention, as well as further features and advantages of the present invention, will be obtained by reference to the following detailed description and drawings.

BRIEF DESCRIPTION OF THE DRAWINGS

FIG. 7 presents diagrams showing the control system architecture for the fully-integrated projector associated with an exemplary embodiment of the present invention.

DETAILED DESCRIPTION

Figure 1:
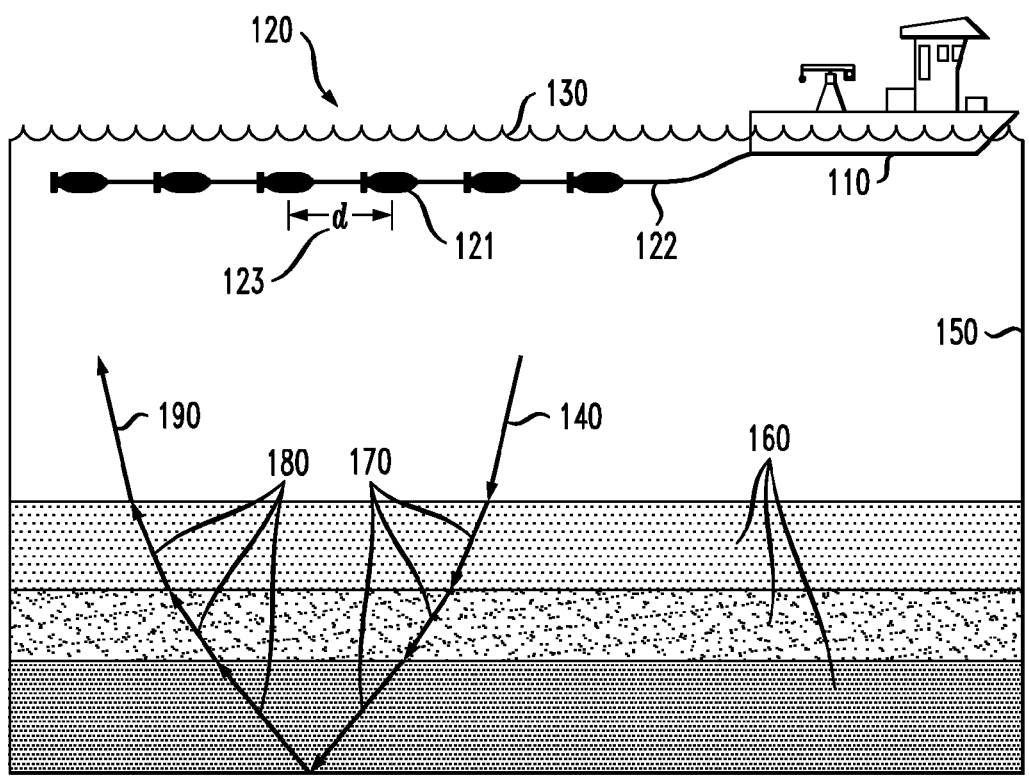
FIG. 1 presents an elevation drawing that outlines the overall concept of an exemplary embodiment of the present invention.

Aspects of the present invention provide a novel coherent sound source that can be used in a spatially distributed array to support marine seismic surveys. The motivation for the present invention stems, in part, from growing environmental concerns regarding the use of impulsive (i.e., incoherent) sound sources (i.e., air guns) as the principal imaging tool for marine seismic surveys.

Aspects of the present invention rely on a spatially distributed array of fully-integrated sound projectors to achieve the requisite source level needed to create an accurate seismic image of the complex media that makes-up the seafloor, yet does not cavitate at the relatively shallow operational depths (i.e., depths on the order of 1 to 10 m) mandated by the survey. Both linear and planar arrays are possible with the exact geometry depending on seismic survey parameters as well as operational performance parameters for the array components and survey vessel which tows the array.

During a typical seismic survey, a surface ship tows separate arrays to transmit and receive sound. The present invention concerns itself with the transmit array and the projector utilized by the transmit array. To this end, a load-bearing umbilical serves as the physical and electrical connection between the survey vessel and the projectors employed by the array. The umbilical transmits electrical power to each array element and serves as a duplex data transmission medium to route commands from the survey vessel to the projectors and report machinery status to the survey vessel from various components and subsystems employed by the projectors. The electrical power utilized by all the components and subsystems in each projector emanates from a dedicated DC power supply located aboard the survey vessel. Accordingly, each projector is equipped with a power regulation and distribution circuit.

In one embodiment, a computer located on the survey vessel serves to centrally control, monitor, and coordinate all functions of the array. Critical parameters such as array element triggering/synchronization and waveform selection are all transmitted to each projector. Once activated, the projector transmits the waveform to the acoustic medium, performs self-monitoring and control operations to ensure that the requisite source level is met, and reports status, i.e., quality control parameters, back to the central computer for further disposition. This process repeats itself until the objectives of the survey are complete. A computer located in each array node (i.e., positioned within each projector) optionally controls all aspects of the projector and contains local control authority and implementation for the principal transduction means and associated components and subsystems. Details concerning the functionality of this computer and its associated control systems are discussed below.

Aspects of the present invention rely on a sound projector configured as a near neutrally buoyant hydrodynamic tow body comprised of a structural plastic and containing a symmetrical arrangement of air-backed plane circular pistons that are driven by a moving armature (i.e., variable reluctance) electro-magnetic force generator. The symmetry inherent with the back-to-back arrangement of pistons results in a virtual node located at the geometric center of transducer thereby providing an acceleration canceling feature that obviates the need for a reaction mass, substantially lowers the overall mass of the projector, and ensures that the device exhibits monopole, as opposed to dipole, directivity characteristics. The pistons are appropriately sized to preclude cavitation, are compliantly suspended, and sealed from seawater intrusion. The pistons employ a high strength-to-weight material with significant loss factor in order to minimize the production of out-of-band noise (i.e., frequencies greater than 100 Hz).

The fundamental resonance of the combined piston-driver system is on the order of a few hertz to tens of hertz which indicates that the pistons will deflect inward under the action of hydrostatic pressure. Typical deflections are likely to exceed the maximum permissible dynamic displacement associated with the piston-driver assembly, therefore a pressure compensation system is employed and consists of a regulated supply of high-pressure air which is applied to the backside of the pistons so that the net static force on the pistons is zero. The air is supplied through a valve network from a series of high-pressure air tanks that are stored within the tow body. The valve network is actuated using a feedback control system, which is implemented and monitored by the computer positioned in the tow body. The control system sets the internal air pressure so that the differential pressure measured by sensors located inside and outside the projector is zero. In concert with the pressure compensation system, is a system to finely adjust the static position of the each piston-armature assembly on an individual basis. That is, the regulated supply of high-pressure air that is applied to the back-side of each piston must contend with machining and assembly tolerances that may not result in returning the piston-armature assembly to the precise neutral position. Returning the piston-armature assembly to the neutral position provides added utility to maximize the dynamic displacement of the assembly. This is accomplished by superimposing a DC bias on the AC drive signal which is applied to the coil (i.e., winding) associated with each piston-armature assembly. The DC bias is controlled by the computer positioned in the tow body. The control system sets the DC bias so that the physical distance measured by a LVDT is maintained with a pre-determined value.

Without any compensatory means in place, the mechanical quality factor (Q) associated with the fundamental resonance of the combined piston-driver assembly can be unacceptably high and necessitates the need for a band-limited velocity feedback control system to mitigate this issue (i.e., substantially reduce the Q). In this way, the dynamic motion of the moving armature shaker (and hence the dynamic range of the projector) is kept within reasonable limits and the phase response through resonance does not exhibit a discontinuity. The feedback signal is derived from the output of an accelerometer positioned on each piston which is passed through a controller after a time-integration step (i.e., integration converts the measured acceleration to velocity). The control signal is combined with the waveform used to drive the transducer at the input stage of a power amplifier which resides in the tow body. The difference between these two signals provides additional damping in the resonance region of the device.

The control system architecture for the transducer employed by the projector also comprises an adaptive in-line compensation filter. The adaptive in-line compensation filter controls the overall gain and modest irregularities in the transfer function between the waveform generator voltage output and radiating piston acceleration for purposes of output waveform fidelity and accurate level control, repeatability, and close consistency among multiple units employed by the transmit array. The compensation filter ensures that the far-field radiated signal from the array is substantially equivalent to the superposition of all array elements operating in phase with the same source strength.

The exemplary compensation filter comprises two cascaded filter components: (1) an all-pass, unity magnitude response, frequency dependent phase modification infinite impulse response (IIR) filter, and (2) a finite impulse response (FIR) filter with tap coefficients computed to minimize the mean square error associated with the difference between the actual and ideal piston velocity, over the frequency range of interest. The actual piston velocity is derived from an accelerometer located on each piston and the ideal piston velocity is a control signal (i.e., a command) that is transmitted from the survey vessel to the projector. The output of the compensation filter is combined with that of the velocity feedback controller at the input stage of the power amplifier that is used to drive the transducer. The entire control system is implemented and monitored by the computer positioned in the tow body.

Notwithstanding the foregoing, if the magnitude and particularly the phase between the piston and the signal emanating from the power amplifier are not sufficiently controlled by the above described adaptive compensation and velocity feedback methods, then in addition, servo-follower control can optionally be applied to improve waveform fidelity. Servo-follower control will also make a spatially distributed array of projectors more robust to any deleterious effects from the mutual radiation impedance (i.e., source coupling) between array elements.

The tow body is equipped with hydrodynamic control surfaces to change the submergence depth of the projector and maintain proper roll angle. Marine seismic surveys are performed at depths on the order of 1 to 10 m, so changing the depth of the projector on a command-actuated basis provides a large degree of system flexibility. In addition, ensuring that the tow body exhibits zero roll angle (i.e., the tow body is required to have no angular offset about the towing axis such that the plane of the pistons is substantially perpendicular to the air-water interface) forces the piston-driver assembly to be held level while it is towed. This is done so that the Earth's gravity cannot cause the pistons to statically deflect from their neutral position which is controlled by balancing the internal and external static pressure. The static positioning system mentioned earlier for the piston-armature assembly also works in concert with the hydrodynamic control surfaces to correct for any deflection of the piston-armature assembly that results from a slight static or dynamic perturbation in the tow body's roll-attitude.

Depth-changing commands from the survey vessel are input to a feedback control system that actuates drive motors that move the control surfaces so that they change the depth of the tow body. The exemplary control system, which is implemented and monitored by the computer positioned in the tow body, monitors the submergence depth using an externally located pressure sensor and adjusts the position of the control surfaces accordingly until the desired depth is achieved and maintained. The same control system architecture is used to maintain proper roll angle in which an omnipresent command of zero roll angle is transmitted from the survey vessel to the projector and compared against the measured roll angle using a gravitometer located within the tow body. The control surfaces are actuated by the feedback control system until the difference between the commanded roll angle and that inferred from the gravitometer is zero. Here it is noted that the tow body is equipped with a keel (i.e., the tow body is designed to have the center-of-buoyancy at a higher elevation point than the center-of-gravity) which provides a righting moment to maintain zero roll angle. The hydrodynamic control surfaces used in conjunction with the feedback control system are employed to provide additional reinforcement to the keel and in particular to actively damp-out roll oscillations and dynamic perturbations in shorter time intervals than would otherwise occur if the keel were used alone.

As indicated above, the projector relies on a moving armature force generator as the principal transduction means which drives a back-to-back (i.e., symmetrical) arrangement of pistons with a time-harmonic signal to radiate sound. Unlike conventional techniques, the moving armature force generator associated with aspects of the present invention relies on a novel magnetic circuit design that is suited for the symmetrical piston arrangement. The disclosed magnetic circuit design consolidates four so-called E-shaped laminated structures into one monolithic laminated structure known as the central lamination circuit.

The arrangement of E-shaped laminated structures is symmetrical about the geometric center of the central lamination circuit thereby employing magnetic symmetry associated with the AC and DC magnetic flux which is provided by two windings and four permanent magnets. The AC magnetic flux is generated when the windings are energized with a time-harmonic current provided by the power amplifier. The direction in which the magnetic flux flows throughout the circuit depends on the manner in which windings are wrapped as well as the phasing of the AC signal. The DC magnetic flux is generated by the permanent magnets with a direction that depends on the physical orientation and polarity of the magnets.

The magnetic circuit also comprises an inner lamination pole, which is analogous to the I-shaped laminated structure associated with prior techniques. The inner lamination pole constitutes the moving armature and is outfitted with a linear drive shaft and bearings that are physically supported by the central lamination circuit. Here it is noted that the term linear drive shaft implies rectilinear motion of the moving armature assembly. The transducer is equipped with two inner lamination poles which in turn are each connected to a piston via a drive linkage. The inner lamination pole along with the permanent magnets and windings are strategically placed within the open spaces of the central lamination circuit to provide an efficient and effective path for the AC and DC magnetic flux to flow (viz., these components have exceedingly low reluctance, low eddy current losses, and have a low degree of fringing). The phasing of AC and DC magnetic flux creates a force gradient in the air gaps that reside between the central lamination circuit and the inner lamination pole which in turn causes the armature assemblies to displace from their neutral position and impart dynamic forces to their respective pistons.

The foregoing can be illustrated in mathematical terms in order to provide further clarification of the underlying physics associated with the transduction mechanism. For this example, only half of the magnetic circuit needs to be analyzed since the transducer employs symmetry. Now then, for an electro-magnetic (i.e., variable reluctance) transducer employing an air gap between two magnetic poles, the force in the air gap is $F=\Phi^2/2\mu_0 A$, where $\Phi$ is the magnetic flux, $\mu_0$ is the magnetic permeability of free-space, and A is the face area of the poles. This equation states that the force is a nonlinear function of the magnetic flux. For the transducer under consideration, the inner lamination pole is positioned in the central lamination circuit such that it has an air gap on either side. Moreover, because of the physical arrangement of the winding, permanent magnets, and inner lamination pole within the central lamination circuit, one of the air gaps has the AC and DC magnetic flux flowing in the same direction and the other has the AC and DC magnetic flux flowing in opposite directions. The superposition of AC and DC magnetic flux that flow throughout the circuit translates into a force gradient that is imposed on the inner lamination pole. This can be expressed mathematically as $F=[(\Phi_{DC}+\Phi_{AC})^2-(\Phi_{DC}-\Phi_{AC})^2]/2\mu_0 A$, where $\Phi_{AC}$ and $\Phi_{DC}$ are the AC and DC magnetic flux, respectively. Here, the terms in the parenthesis represent the magnetic flux associated with each air gap. Moreover, the equation can be simplified to become $F=2\Phi_{AC}\Phi_{DC}/\mu_0 A$, which states that the force is linear with the AC and DC magnetic flux. Further, because the magnetic flux and magnetic field are related by $\Phi=BA$, where B is the magnetic field, the force on the inner lamination pole can be expressed as $F=2AB_{AC}B_{DC}/\mu_0$. Finally, to first order, from Ampere's Law, the magnetic field in a wire is related to the current flowing through the wire as $B=\mu_0 I/2\pi r$, where I is the current and r is the radial distance from the center of the wire to the field point. This indicates that the magnetic force imposed on the inner lamination pole and hence the piston-driver assembly is linear with the AC current applied to the winding from the power amplifier. This design feature is a critical enabler of the technology to produce high, linear force output per unit volume of transduction material.

FIG. 1 presents an elevation drawing that shows the overall concept of using a coherent sound source in marine seismic survey 100 that is representative of an exemplary embodiment of the present invention. Survey vessel 110 tows fully-integrated array 120 comprising sound projectors 121 using load-bearing umbilical 122 below the water surface 130. The physical spacing between the projectors 123 is d which is typically no greater than half an acoustic wavelength at the highest frequency of interest. When the array elements are energized with a time-harmonic signal they generate compressional wave 140 that propagates through water column 150 and is incident on the multilayered media that makes up seafloor 160. The compressional wave is transmitted into the layered media as a series of dilatational waves 170 and 180 and eventually returns to the seawater as compressional wave 190 which is sensed by a receiving array not shown in the figure. Here it is noted that the sound propagation physics described here are highly simplified for reasons of clarity and brevity and does not delve into the concept of shear wave production and reflections at each layer.

Figure 2:
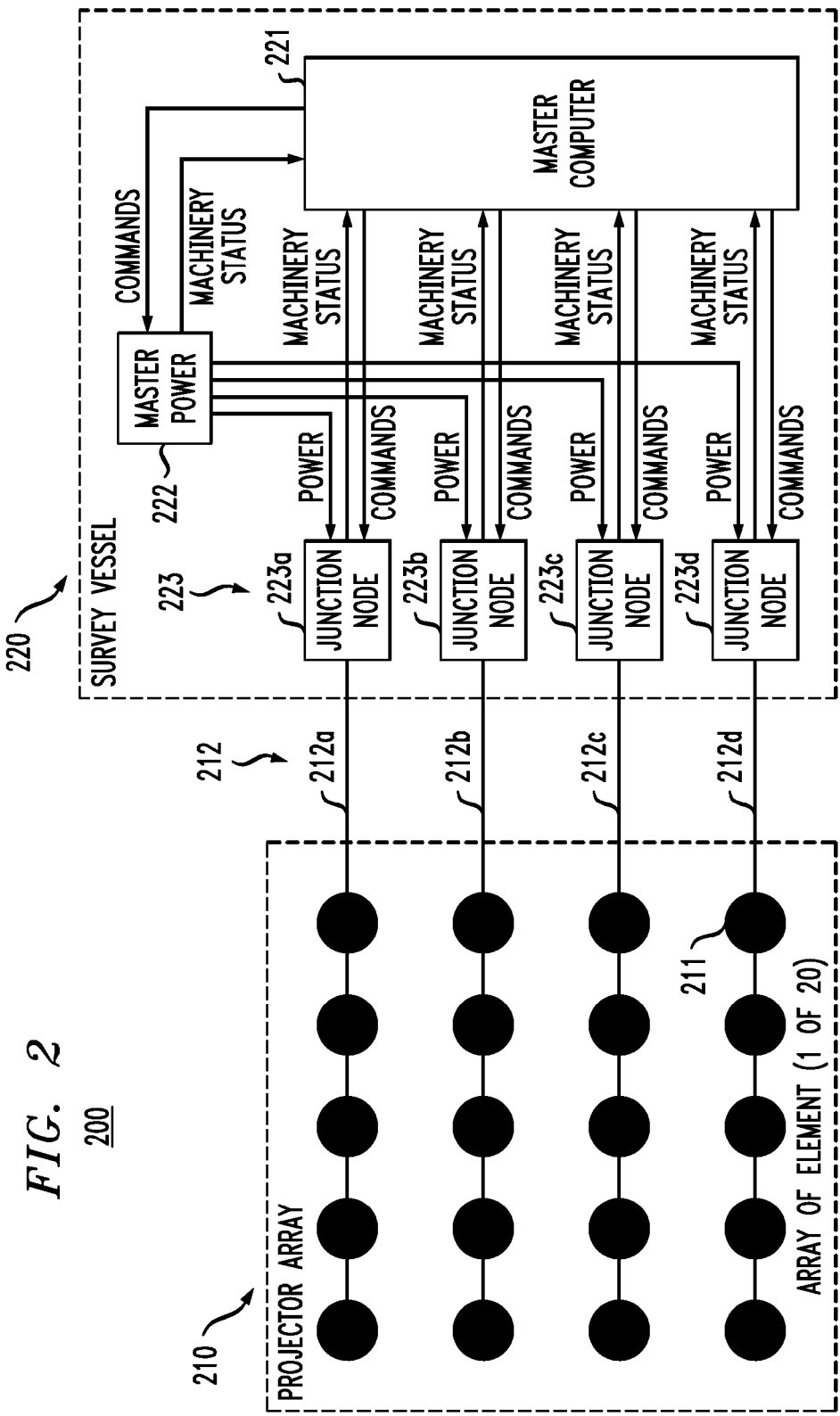
FIG. 2 presents a system diagram showing the overall functionality of an exemplary embodiment of the present invention.

FIG. 2 presents system diagram 200 which shows the overall functionality of the system that is representative of an exemplary embodiment of the present invention. It is merely an example configuration designed to show a hypothetical arrangement of the array, major components used to control the array, and the associated paths of electrical power and data (e.g., commands and machinery status). System diagram 200 is split into two major subsystems comprising components associated with projector array 210 and survey vessel 220. Projector array 210 is a planar configuration of 20-elements arranged in 4-rows and 5-columns. Each projector 211 is a fully-integrated device containing transduction means, system electronics, hydrostatic pressure compensation means, static positioning means for the piston-armature assembly, and hydrodynamic control surfaces that are explained in subsequent figures. The elements of each row are connected to each other and to survey vessel 220 using load-bearing umbilical 212. Here umbilical 212 is the means by which each row of projectors is towed from survey vessel 220 and the means by which electrical power and data (e.g., commands and machinery status) are transmitted. The principal components aboard survey vessel 220 include master computer 221 which serves as the central control authority for the entire system, master power supply 222 which supplies electrical power to the array, and junction nodes 223 which serve as a physical and electrical connection for umbilicals 212. For this example, the system is configured with four junction nodes 223a, 223b, 223c, and 223d, which serve as the connection point for umbilicals 212a, 212b, 212c, and 212d.

Figure 3:
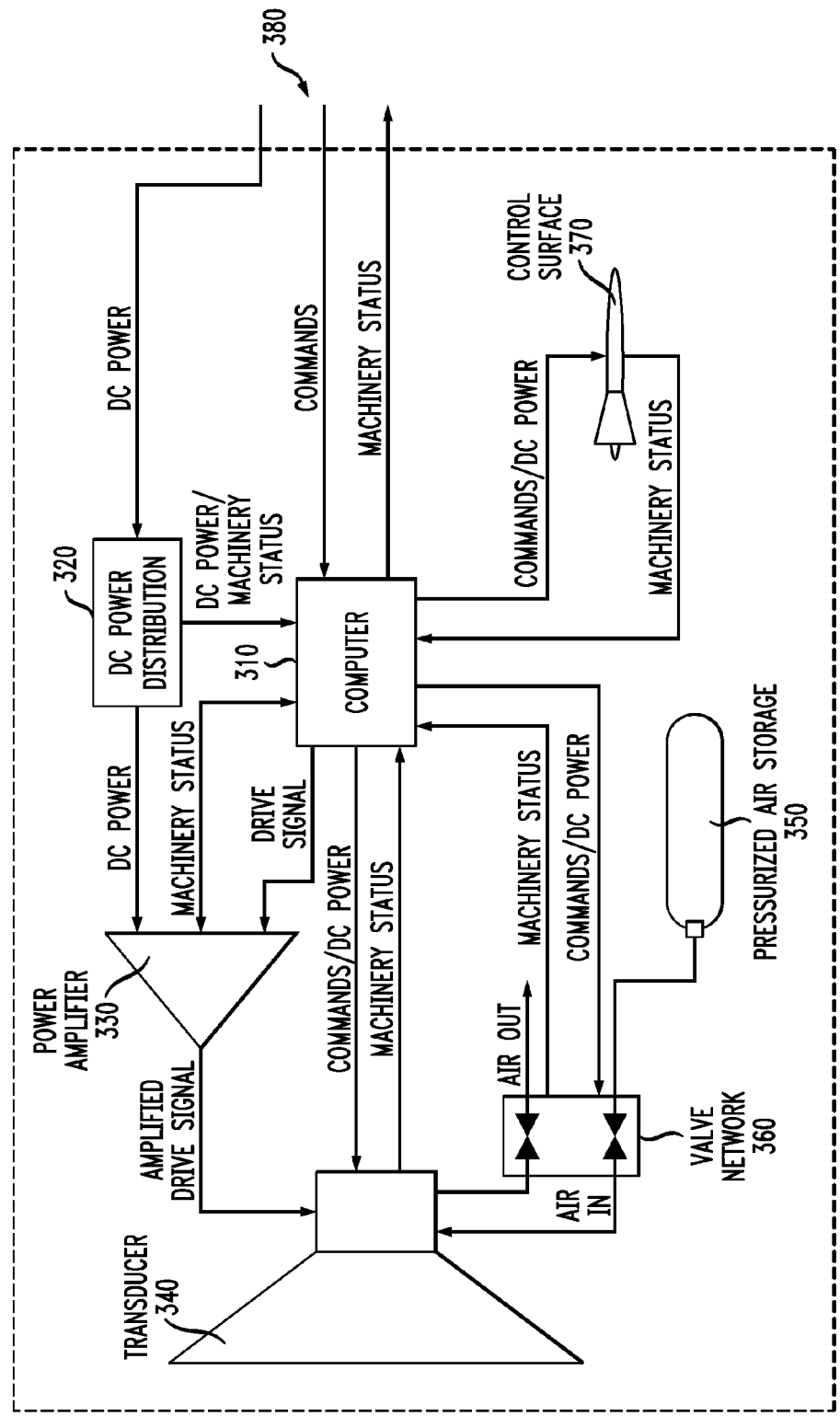
FIG. 3 presents a system diagram showing detailed functionality of a single projector associated with an exemplary embodiment of the present invention.

FIG. 3 presents system diagram 300 that shows detailed functionality of a single projector that is representative of an exemplary embodiment of the present invention. The principal components associated with the projector are computer 310 which serves as the local control authority for the system, DC power distribution circuit 320 which regulates and distributes power received from the survey vessel of FIG. 2, power amplifier 330 which drives transducer 340 with the requisite coherent waveform needed for the survey and provides a DC bias to facilitate static positional adjustments of each piston-armature assembly, pressurized air tank 350 and valve network 360 to provide hydrostatic pressure compensation to transducer 340, and control surface 370 which provides the means to change the depth of the projector and maintain the proper roll angle as it is towed. Umbilical 380 is used to transmit electrical power and data (e.g., commands and machinery status) between the survey vessel of FIG. 2 and the projector. As shown in FIG. 3 a similar paradigm has been adopted for the transmission of power and data for the components employed by the projector.

Figure 4:
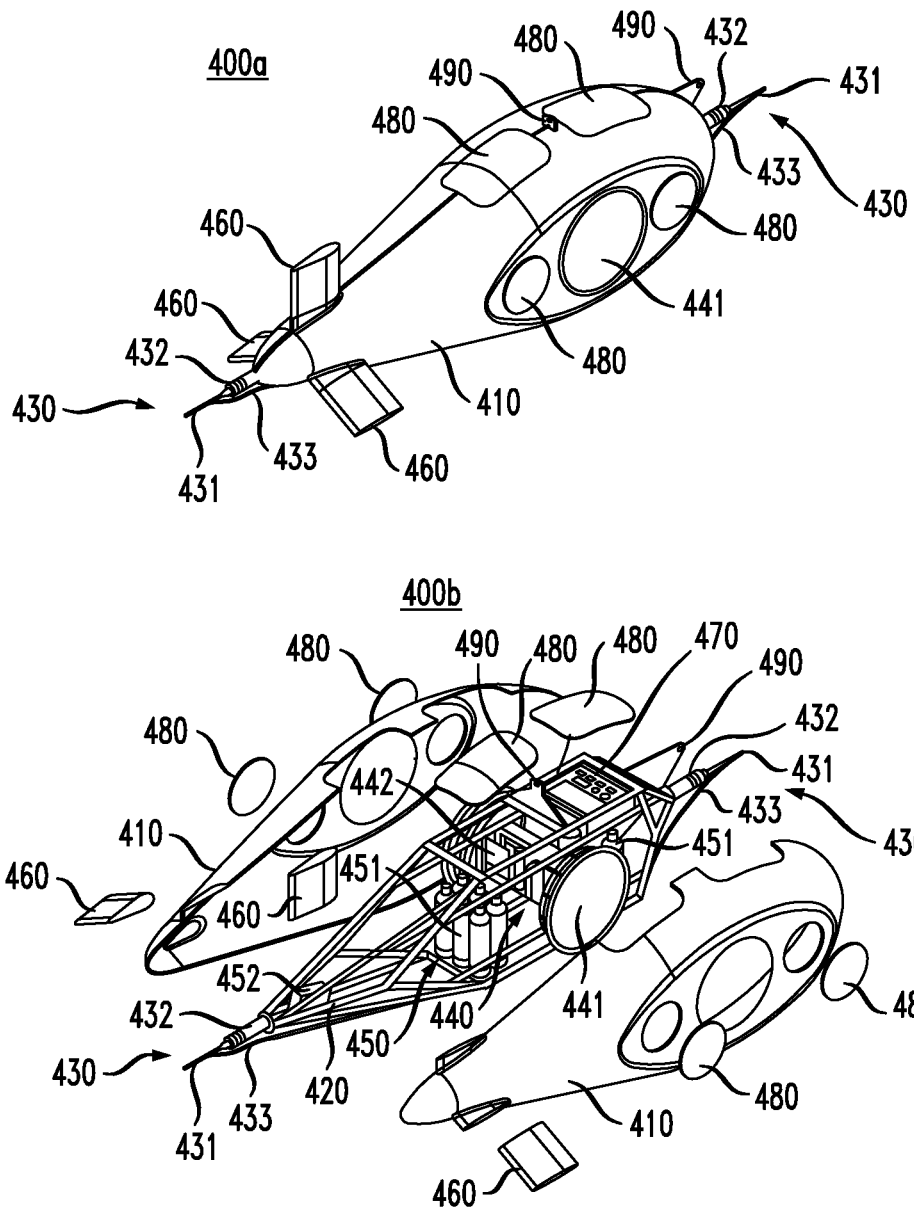
FIG. 4 presents fully-assembled and exploded isometric views showing the fully-integrated projector associated with an exemplary embodiment of the present invention.

FIG. 4 presents fully-assembled and exploded isometric views 400a and 400b showing the fully-integrated projector that is representative of an exemplary embodiment of the present invention. The projector employs a hydrodynamically shaped (i.e., low drag) tow-body 410 made out of a structural plastic such as glass reinforced plastic. The tow-body is fully or partially air-backed which facilitates near neutral buoyancy and provides space for skeletal frame 420 to serve as a mounting structure for the internal components and an attachment point for load-bearing umbilical 430. When the projector is towed, all of the towing forces are transmitted from umbilical 430 to frame 420. Umbilical 430 is further comprised of cable 431 which is a structural member having electrical conductors, connector 432, and safety line 433 to prevent loss of the projector in the event a failure occurs in cable 431 or connector 432. Principal transduction means 440 is ideally positioned at the projector's center-of-gravity and comprises of a back-to-back (i.e., symmetrical) arrangement of plane circular pistons 441 which are mechanically driven by moving armature force generator 442. The pistons are compliantly suspended and sealed in a water-tight fashion, and are appropriately sized to preclude cavitation. Pressure compensation means 450 comprising high-pressure air-flasks 451 and valve network 452 serves to pressurize the interior volume of the tow-body so that the net static load on the piston is zero. Generally, this feature facilitates maximum piston displacement and hence maximum attainable source level when the transducer is energized with a coherent waveform. Control surfaces 460 provide means to change the depth of the projector and maintain the proper roll angle as it is towed. Electronics suite 470 comprises a computer, DC power regulation and distribution circuit, and power amplifier of FIG. 3. The computer has local control authority over all the components within the integrated projector but receives commands from master computer aboard the survey vessel in FIG. 2. Access ports 480 are employed to facilitate repairs, perform preventive maintenance, etc. to the components residing within the tow-body. Lifting eyes 490 are utilized for the purpose of transporting and deploying the projector without imparting point loads to the tow-body. The forces applied to lifting eyes 490 are transmitted to frame 420. Though not shown in FIG. 4, an alternative tow body material is solid blocks of syntactic foam to minimize any potentially deleterious effects from the approximate pressure-release boundary condition the tow body presents to the acoustic field radiated by pistons 441. In this embodiment, only the volume occupied by principal transduction means 440 is filled with pressurized air for the purpose of pressure compensation. Moreover, the syntactic foam blocks would be molded or machined in an appropriate manner to accommodate the other components and would necessitate a more simplified design of frame 420 since syntactic foam has a fair amount of structural rigidity.

Figure 5:
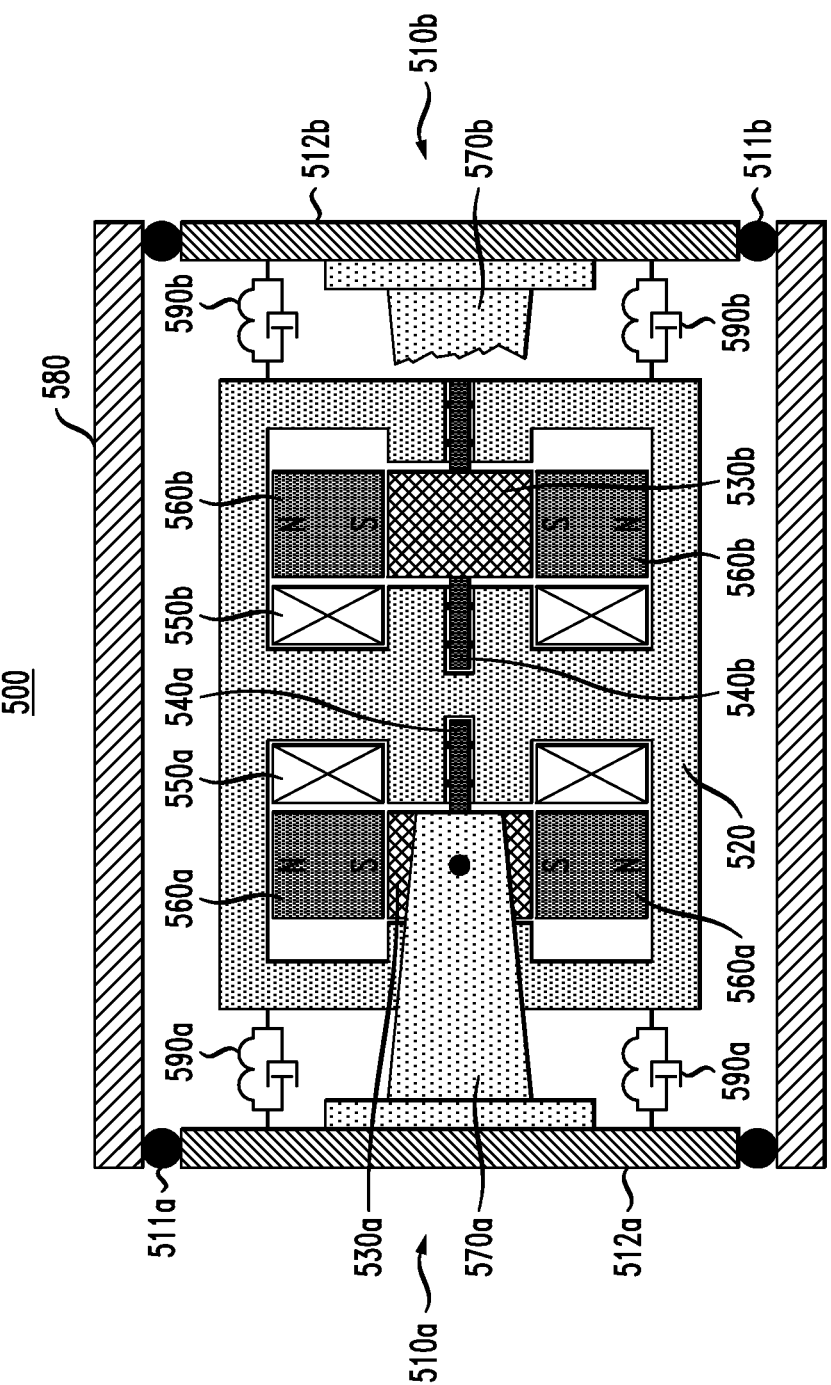
FIG. 5 presents a functional section view of the principal transduction means associated with the fully-integrated projector associated with an exemplary embodiment of the present invention.

FIG. 5 presents a functional section view of principal transduction means 500 associated with the fully-integrated projector shown in FIG. 3 and FIG. 4 that is representative of an exemplary embodiment of the present invention. A back-to-back (i.e., symmetrical) arrangement of piston assemblies 510a and 510b are driven by a moving armature force generator comprised of central lamination circuit 520, inner lamination poles 530a and 530b, linear drive shaft/bearing assemblies 540a and 540b, windings 550a and 550b, and permanent magnets 560a and 560b. The symmetry inherent with the back-to-back arrangement of pistons results in a virtual node located at the geometric center of central lamination circuit 520 thereby providing an acceleration canceling feature which obviates the need for a reaction mass, substantially lowers the overall mass of the projector, and ensures that the device exhibits monopole, as opposed to dipole, directivity characteristics. Piston assemblies 510a and 510b are sealed from water intrusion via rolling element seals (or equivalent means) 511a and 511b and employ a high strength-to-weight material with significant loss factor (e.g., carbon fiber laminate with extensional and/or constrained layer damping treatments) to ensure that the active radiating surfaces 512a and 512b have their first flexural mode resonance well-above the highest frequency of interest. The damping treatments ensure that the mechanical quality factor of modes above the fundamental piston-driver resonance frequency is sufficiently low to mitigate any concerns with respect to out-of-band noise. Piston assemblies 512a and 512b are appropriately sized to preclude cavitation wherein the dynamic pressure radiated from the active face is substantially lower than the static pressure associated with seawater submergence. Inner lamination pole 530a and 530b along with linear drive shaft/bearing assembly 540a and 540b constitute the principal components of the moving armature assembly. The force is transmitted from the moving armature assembly to the active radiating surfaces 512a and 512b via drive linkages 570a and 570b. Piston assemblies 510a and 510b are compliantly suspended from housing 580 using damped suspension springs 590a and 590b. Though not shown in FIG. 5 central lamination circuit 520 is rigidly connected to housing 580 as discussed in FIG. 4.

Figure 6:
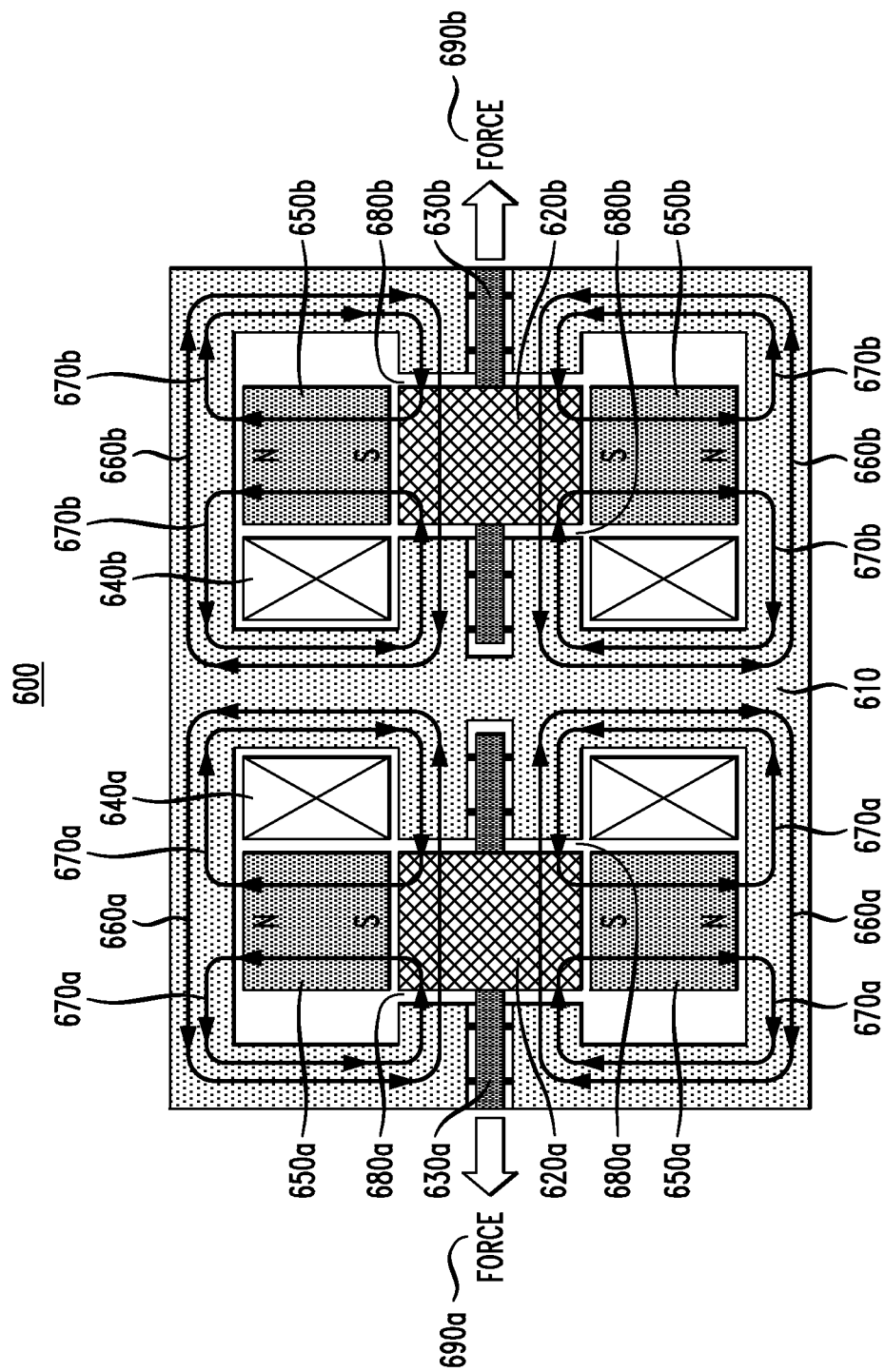
FIG. 6 presents a diagram showing how the principal transduction means converts magnetic flux to force for an exemplary embodiment of the present invention.

FIG. 6 presents diagram 600 showing how the principal transduction means converts the AC and DC magnetic flux to dynamic force that is representative of an exemplary embodiment of the present invention. The moving armature force generator consists of central lamination circuit 610, inner lamination poles 620a and 620b, linear drive shaft/bearing assemblies 630a and 630b, windings 640a and 640b, and permanent magnets 650a and 650b. The descriptors 'a' and 'b' in the labeling nomenclature are indicative of the left- and right-sides of the force generator. The components labeled with 'a' and 'b' are identical such that there is magnetic symmetry about the geometric center of central lamination circuit 610 which is mechanically grounded. AC magnetic flux 660a and 660b are generated when windings 640a and 640b are energized with a time-harmonic AC signal. The direction of magnetic flux 660a and 660b depends on the manner in which windings 640a and 640b are wrapped around central lamination circuit 610 as well as the phasing of the AC signal. DC magnetic flux 670a and 670b are generated by magnets 650a and 650b with a direction that depends on the physical orientation and polarity of the magnets. The phasing of AC and DC magnetic flux 660a, 660b, 670a and 670b creates a force gradient in air gaps 680a and 680b which in turn causes the armature assemblies to displace from their neutral position with dynamic forces 690a and 690b. Additional DC magnetic flux is generated when windings 640a and 640b are energized with a DC bias which results in a change in the static position of inner lamination poles 620a and 620b.

FIG. 7 presents diagrams 700a and 700b which show the control system architecture for the fully-integrated projector that is representative of an exemplary embodiment of the present invention. Diagram 700a presents the architecture for pressure compensation and control surface actuation, whereas diagram 700b presents the architecture for high-fidelity operation of the transducer. With regard to diagram 700a, a feedback control architecture is employed consisting of input 710a, output 720a, feedback controller 730a, the component being controlled 740a, monitoring sensor 750a, and summing block 760a.

For the case of the pressure compensation system, input 710a, output 720a, component 740a, and sensor 750a correspond to the signal from an external pressure sensor, regulated air pressure applied to the driving piston, valve network, and the signal from an internal pressure sensor, respectively. The driving piston is pressure compensated when the difference between the internal and external pressure sensors is either zero or meets some user-defined threshold. The differencing operation is computed by summing block 760a. Here it is noted that the terms internal and external indicate the position of sensors located inside and outside of the tow body shown in FIG. 4.

For the case of adjusting the static position of the piston-armature assembly, input 710a, output 720a, component 740a, and sensor 750a correspond to a prescribed value for the position of the piston-armature assembly, a DC bias applied to the winding, static positional change of the piston-armature assembly, and a signal from a proximity/positional sensor such as a LVDT. The piston-armature assembly is positioned at the proper location when the difference between the measured and prescribed values meets some user defined threshold. The differencing operation is computed by summing block 760a.

For the case of the control surface actuation to change or maintain depth, input 710a, output 720a, component 740a, and sensor 750a correspond to a command from the survey vessel, actuation of a motor which moves the control surfaces to the desired position, the control surfaces themselves, and the signal from an external pressure sensor, respectively. The projector is positioned at the desired depth when the difference between the commanded depth and that inferred from the external pressure sensor is either zero or meets some user-defined threshold. The differencing operation is computed by summing block 760a.

For the case of the control surface actuation to maintain the proper (i.e., zero) roll angle, input 710a, output 720a, component 740a, and sensor 750a correspond to a command from the survey vessel, actuation of a motor which moves the control surfaces to the desired position, the control surfaces themselves, and the signal from an internal gravitometer, respectively. The projector is positioned at the desired roll angle when difference between the commanded roll angle and that inferred from the gravitometer is either zero or meets some user-defined threshold. The differencing operation is computed by summing block 760a.

With regard to diagram 700b, feedback control architecture 710b is combined with adaptive in-line compensation filter 720b to modify drive signal 730b so that radiating piston acceleration 740b is optimum from the stand-point of controlling the mechanical quality factor associated with the principal resonance of the transducer and to minimize the unit-to-unit variance in the sound radiated by the transducer in a spatially distributed array so that the far-field radiated signal is substantially equivalent to the superposition of all array elements operating in phase with the same source strength. With some modification, adaptive in-line compensation filter 720b can provide means to correct drive signal 730b to account for any potential deleterious effects from the mutual radiation impedance associated with adjacent array elements (i.e., source coupling) as well as any significant aberrations associated with the magnitude and phase response of the combined piston-driver system.

Feedback control architecture 710b is used to reduce the aforementioned quality factor and comprises plant transfer function 711b, velocity feedback controller 712b, and summing block 713b. Plant transfer function 711b relates the magnitude and phase response of the piston acceleration to the waveform fed into the power amplifier. Velocity feedback controller 712b introduces additional damping via electrical means in the resonance region associated with the transducer to affect a stable band-limited response of the transducer. In this way the physical displacement associated with the moving armature assembly of FIG. 6 will not exceed the air-gap length and impact the central lamination circuit. The damping also minimizes the discontinuity associated with the phase response through resonance. Summing block 713b combines the signal from feedback controller 712b and adaptive in-line compensation filter 720b to affect the desired result.

Adaptive in-line compensation filter 720b is used to minimize the unit-to-unit variance in the sound radiated by the transducer in a spatially distributed array and consists of compensation filter 721b, adaptive controller 722b, control signal for desired piston acceleration 723b, and summing block 724b. Compensation filter 722b and adaptive controller 723b constitute a cascaded set of IIR and FIR filters designed to minimize the mean-square error associated with radiating piston acceleration 740b and control signal 723b using summing block 724b to compute the difference between the two signals. In this way modest irregularities of plant transfer function 711b can be accounted for so that the far-field radiated signal from the array is substantially equivalent to the superposition of all array elements operating in phase with the same source strength.

It is to be understood that the embodiment described herein is merely illustrative of the principles of this invention and that various modifications may be implemented by those skilled in the art without departing from the scope and spirit of the invention.

What is claimed is:

1. An underwater sound projector for producing time-harmonic waveforms, comprising two pistons positioned on either side of an electro-magnetic force generator substantially having mechanical and magnetic symmetry about its geometric center thereby creating a virtual node to substantially cancel reaction loads that occur when the two pistons are actuated, wherein said electro-magnetic force generator comprises at least two stationary coils physically connected to a stator, at least four permanent stationary magnets and at least two moving armatures that drive said two pistons.

2. The underwater sound projector of claim 1, wherein said electro-magnetic force generator relies on a variable reluctance principal and utilizes a superposition of AC and DC magnetic flux generated by said at least two stationary coils and said at least four permanent stationary magnets positioned within and attached to a stationary magnetic circuit comprised of a laminated structure to produce dynamic forces on said at least two moving armatures that are linear with the AC current applied to the at least two stationary coils.

3. The underwater sound projector of claim 2, wherein said at least two moving armatures are physically connected to said two pistons that are sized to generate sound waves without cavitation.

4. The underwater sound projector of claim 1, further comprising a feedback controller to reduce the mechanical quality factor of the fundamental resonance associated with the force generator and said two pistons.

5. The underwater sound projector of claim 1, further comprising an in-line adaptive compensation filter to ensure that a far-field radiated signal from an array of said projectors is substantially equivalent to a superposition of all array elements operating in phase with an identical source strength.

6. The underwater sound projector of claim 1, further comprising a pressure compensation system utilizing high pressure air regulated by a feedback control system to balance a static load on the two pistons resulting from submergence in water.

7. The underwater sound projector of claim 1, further comprising means to finely adjust a static position of the moving armature and two pistons using a feedback control system which applies a DC bias to a same coil as an AC drive signal.

8. The underwater sound projector of claim 1, wherein said underwater sound projector is configured in a near neutrally buoyant hydrodynamic tow body and containing control surfaces that are operated by a feedback control system to adjust a submergence depth and a roll angle.

9. An array of underwater sound projectors for producing time-harmonic waveforms, comprising:
  a plurality of said underwater sound projectors, a given one of said plurality of said underwater sound projectors comprising:
  two pistons positioned on either side of an electro-magnetic force generator substantially having mechanical and magnetic symmetry about its geometric center thereby creating a virtual node to substantially cancel reaction loads that occur when the two pistons are actuated, wherein said electro-magnetic force generator comprises at least two stationary coils physically connected to a stator, at least four permanent stationary magnets and at least two moving armatures that drive said two pistons; and
  a load-bearing umbilical that connects said given underwater sound projector to a ship, transmits electrical power to each array element and serves as a duplex data transmission medium to route commands from the ship to the given underwater sound projector and report machinery status to the ship.

10. The array of underwater sound projectors of claim 9, wherein said underwater sound projectors are controlled remotely by a computer positioned on the ship and controlled locally by a computer positioned within each array element with said computers operating in a master-slave arrangement.

11. The array of underwater sound projectors of claim 9, wherein said electro-magnetic force generator relies on a variable reluctance principal and utilizes a superposition of AC and DC magnetic flux generated by said at least two stationary coils and said at least four permanent stationary magnets positioned within and attached to a stationary magnetic circuit comprised of a laminated structure to produce dynamic forces on said at least two moving armatures that are linear with the AC current applied to the at least two stationary coils.

12. The array of underwater sound projectors of claim 11, wherein said at least two moving armatures are physically connected to said two pistons that are sized to generate sound waves without cavitation.

13. The array of underwater sound projectors of claim 9, wherein said underwater sound projectors further comprise a feedback controller to reduce the mechanical quality factor of the fundamental resonance associated with the force generator and said two pistons.

14. The array of underwater sound projectors of claim 9, wherein said underwater sound projectors further comprise an in-line adaptive compensation filter to ensure that a far-field radiated signal from an array of said projectors is substantially equivalent to a superposition of all array elements operating in phase with an identical source strength.

15. The array of underwater sound projectors of claim 9, wherein said underwater sound projectors further comprise a pressure compensation system utilizing high pressure air regulated by a feedback control system to balance a static load on the two pistons resulting from submergence in water.

16. The array of underwater sound projectors in claim 9, wherein said underwater sound projectors further comprise means to finely adjust a static position of the moving armature and two pistons using a feedback control system which applies a DC bias to a same coil as an AC drive signal.

17. The array of underwater sound projectors of claim 9, wherein said underwater sound projectors are configured in a near neutrally buoyant hydrodynamic tow body and contain control surfaces that are operated by a feedback control system to adjust a submergence depth and a roll angle.

* * * * *